(12) United States Patent
Sugiura et al.

(10) Patent No.: US 8,311,731 B2
(45) Date of Patent: Nov. 13, 2012

(54) ROBOTS WITH COLLISION AVOIDANCE FUNCTIONALITY

(75) Inventors: Hisashi Sugiura, Frankfurt (DE);
Herbert Janssen, Muhlhausen (DE);
Michael Gienger, Frankfurt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 924 days.

(21) Appl. No.: 12/052,483

(22) Filed: Mar. 20, 2008

(65) Prior Publication Data
US 2008/0234864 A1    Sep. 25, 2008

(30) Foreign Application Priority Data
Mar. 23, 2007   (EP) .................................... 07104815

(51) Int. Cl.
*G06F 19/00* (2006.01)
*G06T 15/00* (2006.01)
(52) U.S. Cl. ........ 701/301; 345/474; 345/473; 345/475; 700/246; 700/252; 703/2
(58) Field of Classification Search .................. 700/255, 700/250, 245, 247, 251, 61, 252, 246; 318/568.11, 318/568.12; 395/86; 701/301; 345/474, 345/473, 475; 703/2
See application file for complete search history.

(56) References Cited

U.S. PATENT DOCUMENTS

| | | | |
|---|---|---|---|
| 5,347,459 A | 9/1994 | Greenspan et al. | |
| 5,737,500 A | 4/1998 | Seraji et al. | |
| 6,023,645 A | 2/2000 | Harima et al. | |
| 6,181,983 B1 | 1/2001 | Schlemmer et al. | |
| 6,438,456 B1 | 8/2002 | Feddema et al. | |
| 6,493,607 B1 | 12/2002 | Bourne et al. | |
| 6,678,582 B2 * | 1/2004 | Waled ........................... | 700/245 |

(Continued)

FOREIGN PATENT DOCUMENTS

EP    1972415 A1    9/2008

(Continued)

OTHER PUBLICATIONS

Abdel-Malek et al., "Optimization-Based Trajectory Planning of the Human Upper Body," Robotica, 2006, pp. 683-696, vol. 24, Cambridge University Press.

(Continued)

Primary Examiner — Ronnie Mancho
(74) Attorney, Agent, or Firm — Fenwick & West LLP

(57) ABSTRACT

A robot is provided with a motion control unit that avoids collision between segments of the robot or between segments of the robot and other objects. The motion control unit of the robot comprises a distance computing module, a whole body control module, a collision avoidance module, and a blending control unit. The distance computing module calculates two closest points of different segments of the robot connected to each other via at least one joint or a segment of the robot and another object. The collision avoidance module is provided with the information about the two closest points. The blending control unit combines the weighted output control signals of the whole body control module and the collision avoidance control module. The weight of the whole body control output signal is higher when the risk of collision is lower. The weight of the collision avoidance control output signal is higher when the risk of collision is higher. The collision avoidance module is designed to control a collision avoidance action only in the direction parallel to a line connecting between the two closest points.

20 Claims, 3 Drawing Sheets

U.S. PATENT DOCUMENTS

| | | | |
|---|---|---|---|
| 6,687,571 | B1 | 2/2004 | Byrne et al. |
| 6,922,034 | B2* | 7/2005 | Hirose ............... 318/568.11 |
| 7,257,237 | B1* | 8/2007 | Luck et al. ............... 382/103 |
| 7,403,880 | B2 | 7/2008 | Maille et al. |
| 7,415,321 | B2 | 8/2008 | Okazaki et al. |
| 626,569 | A1 | 12/2009 | Lanier |
| 2006/0095160 | A1 | 5/2006 | Orita et al. |
| 2006/0111881 | A1 | 5/2006 | Jackson |
| 2007/0016329 | A1* | 1/2007 | Herr et al. ............... 700/250 |
| 2007/0146371 | A1* | 6/2007 | Dariush ............... 345/474 |
| 2007/0162164 | A1* | 7/2007 | Dariush ............... 700/61 |
| 2008/0243307 | A1 | 10/2008 | Toussaint |
| 2008/0312771 | A1 | 12/2008 | Sugiura |
| 2011/0035050 | A1 | 2/2011 | Kim et al. |

FOREIGN PATENT DOCUMENTS

| | | | |
|---|---|---|---|
| EP | 1972416 | A1 | 9/2008 |
| EP | 1974869 | A1 | 10/2008 |
| FR | 2861857 | A | 5/2005 |
| JP | 2005-202927 | | 7/2005 |

OTHER PUBLICATIONS

Amit, R. et al., "Parametric Primitives for Motor Representation and Control," In Proceedings of the 2002 International Conference on Robotics and Automation (ICRA), May 2002, pp. 863-868.

Bizzi, E. et al., "Modular Organization of Spinal Motors Systems," The Neuroscientist, 2002, pp. 437-442, vol. 8, No. 5.

Capi, G. et al., "A New Optimization Method Based on Genetic Algorithm for Walking Humanoid Robots," Conference Proceedings, Apr. 27, 2000, pp. 61-66.

European Extended Search Report, European Application No. 07104820.1, Oct. 25, 2007, 7 pages.

European Extended Search Report, European Application No. 07104815.1, Feb. 2, 2008, 13 pages.

European Extended Search Report, European Application No. 07104900.1, Feb. 7, 2008, 6 pages.

European Partial Search Report, European Application No. 07104815.1, Oct. 24, 2007, 7 pages.

Gienger, M. et al., "Exploiting Task Intervals for Whole Body Robot Control," Proceedings of the 2006 IEEE/RSJ International Conference on Intelligent Robots and Systems, Oct. 9-15, 2006, pp. 2484-2490.

Gienger, M. et al., "Task-Oriented Whole Body Motion for Humanoid Robots," Proceedings for the 2005 5$^{th}$ IEEE-RAS International Conference on Humanoid Robots, 2005, pp. 238-244.

Heim, A. et al., "Trajectory Optimization of Industrial Robots with Application to Computer-Aided Robotics and Robot Controllers," Optimization, pp. 407-420, vol. 47.

Ijspeert, A. et al., "Trajectory Formation for Imitation with Nonlinear Dynamical Systems," In Proceedings of the IEEE/RSJ International Conference on Intelligent Robots and Systems, Oct. 29-Nov. 3, 2001, pp. 752-757.

Janabi-Sharifi, F. et al., "Integration of the Artificial Potential Field Approach with Simulated Annealing for Robot Path Planning," Proceedings of the 1993 IEEE International Symposium on Intelligent Control, 1993, Aug. 25, 1993, pp. 536-541.

Kuffner, J. et al., "Dynamically-Stable Motion Planning for Humanoid Robots," Autonomous Robots, 2002, pp. 105-118, vol. 12.

Kuffner, J. et al., "Self-Collision Detection and Prevention for Humanoid Robots," Proceedings of the 2002 IEEE International Conference on Robotics & Automation, May 2002, pp. 2265-2270.

Lee, J-K. et al., "Motion Planning for a Mobile Manipulator to Execute a Multiple Point-to-Point Task," Proceedings of the 1996 LEEE/RSJ International Conference on Intelligent Robots and Systems '96, IROS 96, Nov. 4-8, 1996, pp. 737-742.

Mussa-Ivaldi, F.A. et al., "Linear Combinations of Primitives in Vertebrae Motor Control," Neurobiology, Aug. 1994, pp. 7534-7538, vol. 91.

Nemec, B. et al., "Implementation of Force Control on Redundant Robot," Proceedings of the 1998 IEEE/RSJ Intl. Conference on Intelligent Robots and Systems, Oct. 13, 1998, pp. 1314-1319 vol. 2.

Schaal, S. et al., "Control, Planning, Learning, and Imitation with Dynamic Movement Primitives," in Workshop on Bilateral Paradigms on Humans and Humanoids, IEEE International Conference on Intelligent Robots and Systems, 2003, Las Vegas, NV, pp. 1-21.

Schlemmer, M. et al., "Real-Time Collision-Free Trajectory Optimization of Robot Manipulators via Semi-Infinite Parameter Optimization," International Journal of Robotics Research, Sep. 1998, pp. 1013-1102, vol. 17, No. 9.

Zhang, J. et al., "An Enhanced Optimization Approach for Generating Smooth Robot Trajectories in the Presence of Obstacles," Proceedings of the 1995 European Chinese Automation Conference, London, Sep. 1995, pp. 263-268.

* cited by examiner

US 8,311,731 B2

ROBOTS WITH COLLISION AVOIDANCE FUNCTIONALITY

RELATED APPLICATIONS

This application claims priority under 35 U.S.C. §119(a) to European Patent Application number 07 104 815, filed on Mar. 23, 2007, which is incorporated by reference herein in its entirety. This application is related to U.S. patent application Ser. No. 12/050,948, filed on Mar. 19, 2008; and U.S. patent application Ser. No. 12/053,218, filed on Mar. 21, 2008, which are incorporated by reference herein in their entirety.

FIELD OF THE INVENTION

The present invention generally relates to robots, more specifically to robots acting autonomously and requiring a safety mechanism to avoid collisions with other objects as well as collision between one moveable segment of the robot with another segment of the robot.

BACKGROUND OF THE INVENTION

When a trajectory of an effector such as a robot is controlled, a target state needs to be defined. The target state is, for example, defined by an object handled by a manipulating arm of a robot. In general, the position of the object can be described by three parameters. In addition to the object position, it is often necessary to describe a spatial orientation by Kardan-angles or Euler-angles.

To carry out the movement of an effector of a robot, the trajectory is usually generated by mapping increments from a control parameter space on a configuration space.

The control parameter space or task space is the space of the command elements. The control parameter space is composed of the command elements. The command (also "target" or "task") elements are the elements of a respective command vector. These elements define a useful description about what should be controlled, for example, the position of a hand or the tilting of a head. The configuration space is the space of controllable degrees of freedom. The configuration space can be composed of individual joints of a robot and/or more complex kinematics mechanisms having controllable degrees of freedom.

"Null space" represents the dimensional difference between the joint space and the task space. The null space contains redundant degrees of freedom that allow movements to be performed without affecting task space motion. The null space is defined as a set of arguments of a linear operator such that the corresponding function value is zero. Redundant systems have a (local) null space that can be used to address a secondary objective, such as kinematic conditioning, without disturbing a primary task.

Conventionally, targets of robots were provided by operators and the robots merely tracked planned trajectories. The safety mechanism in conventional robots is an emergency stop mechanism that simply freezes motions, if any motions were being performed. Modern robots, in particular humanoid robots, are expected to work outside the typical environment such as factories. The modern robots need to interact with dynamic environment that is less predictable. Thus, there is a need for a more advanced safety mechanism, hereinafter referred to as a collision avoidance mechanism instead of the emergency stop mechanism. The advantage of using the collision avoidance is not only safety. The collision avoidance does not necessarily stop the robot's target reaching motions and may expand the robot's working range.

The known collision avoidance mechanism may be divided into two categories. One category of collision avoidance mechanism is a planning (non real-time) method which generates trajectories taking obstacles into account.

James Kuffner et al., "Self-collision detection and prevention for humanoid robots," In proceedings of the IEEE International Conference on Robotics and Automation, 2002, which is incorporated by reference herein in its entirety, proposes a collision avoidance on a humanoid robot. This document proposes a fast collision detection method and a real-time planning for gait generations taking leg interference into account.

James Kuffner et al., "Dynamically-stable motion planning for humanoid robots," Autonomous Robots, volume 12, pages 105-118, 2002, which is incorporated by reference herein its entirety, proposes a dynamics based collision free planning method using Rapidly exploring Random Trees (RRTs). However, these methods are difficult to apply to interactive motions because the computation time becomes longer as the degrees of freedom of robots (e.g., humanoid robots) increase.

Another category of the collision avoidance is reactive (real-time) collision avoidance. The reactive collision avoidance modifies trajectories that are quite simple such as line segments connecting current positions and target positions.

In order to use this method, the direction of avoidance and how to switch the priority between target reaching motions and collision avoidance motions must be decided depending on the magnitude of danger of collisions in real-time. For instance, if the distance between segments is large enough, target reaching motions should have higher priority than collision avoidance motions.

Null space optimization criteria may be used for collision avoidance (see, for example, Michael Gienger, Herbert Janssen, and Christian Goerick, "Task-oriented whole body motion for humanoid robots," In proceedings of the IEEE RAS International Conference on Humanoid Robots, 2005; and Michael Gienger, Herbert Janssen, and Christian Goerick, "Exploiting task intervals for whole body robot control," In proceedings of the IEEE/RSJ International Conference on Intelligent Robots and Systems, 2006, which are incorporated by reference herein in their entirety).

SUMMARY OF THE INVENTION

It is an object of the present invention to provide an efficient collision avoidance technique for a robot which minimizes interferences with the task execution of the robot.

One embodiment of the present invention provides a method for controlling a robot. In this method, a target for a motion of the robot is defined. A motion control signal adapted for the robot reaching the target is calculated. A collision avoidance control signal based on the closest points of different segments of the robot connected to each other via at least one joint or a segment of the robot and another object is calculated. The weighted motion control signal and the weighted collision avoidance control signal are combined. The weight of the motion control output signal is higher when a calculated collision risk is lower. The weight of the collision avoidance control output signal is higher when the calculated collision risk is higher. The motion of the robot is controlled according to the combined weighted signal.

In one embodiment of the present invention, a soft task switching between target reaching by motion and collision avoidance is achieved by gradually changing the weights.

In one embodiment of the present invention, the motion control calculation comprises mapping a collision avoidance motion in the null space and a target reaching motion in the task space. Thus, the motion control calculation takes collision avoidance into account in the null space even when the collision avoidance control output signal is weighted with zero and is inactivated.

In one embodiment of the present invention, the collision avoidance control maps a collision avoidance motion in the task space and a target reaching motion in the null space. Thus, even when the motion control signal is weighted with zero and inactive, the collision avoidance control is able to contribute to the target reaching in the null space where redundant degrees-of-freedom is available. This promotes the target reaching capabilities of the robot.

In one embodiment of the present invention, the weight of the collision avoidance output signal remains zero as long as the distance between the closest points is larger than a preset avoidance threshold distance.

One embodiment of the present invention also provides a method for controlling a robot. The motion control module of the robot includes a collision avoidance module for calculating the two closest points of different segments of the robot connected to each other via at least one joint or a segment of the robot and another object. The motion control module also controls avoidance action only in the dimension along a line connecting between the two closest points. The fact that the collision avoidance motion is limited to a single degree-of-freedom increases the null space motion of the collision avoidance control allowed for a target reaching motion although the collision avoidance control allocates higher priority to the collision avoidance task and not to the target reaching task.

One embodiment of the present invention also provides a computer program product embedded in a robot for implementing the above described methods.

One embodiment of the present invention provides a robot having a motion control unit. The motion control unit includes, among others, a distance computing module, a motion control unit, a collision avoidance module, and a blending control unit. The distance computing module calculates the two closest points of different segments of the robot connected to each other via at least one joint or a segment of the robot and another object. The collision avoidance module is provided with an output signal from the distance computing module. The blending control unit combines the weighted output control signals of the motion control module and the collision avoidance control module. The weight of the motion control output signal is higher when a calculated collision risk is lower. The weight of the collision avoidance control output signal is higher when the calculated collision risk is higher.

One embodiment of the present invention provides a robot having a motion control unit where the motion control of the robot includes a collision avoidance module designed for calculating the two closest points of different segments of the robot connected to each other via at least one joint or two closest points of a segment of the robot and another object. The collision avoidance module also controls the collision avoidance action only in the dimension along the line connecting between the two closest points.

The invention can be implemented, for example, on a humanoid robot such as a bipedal walking robot.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
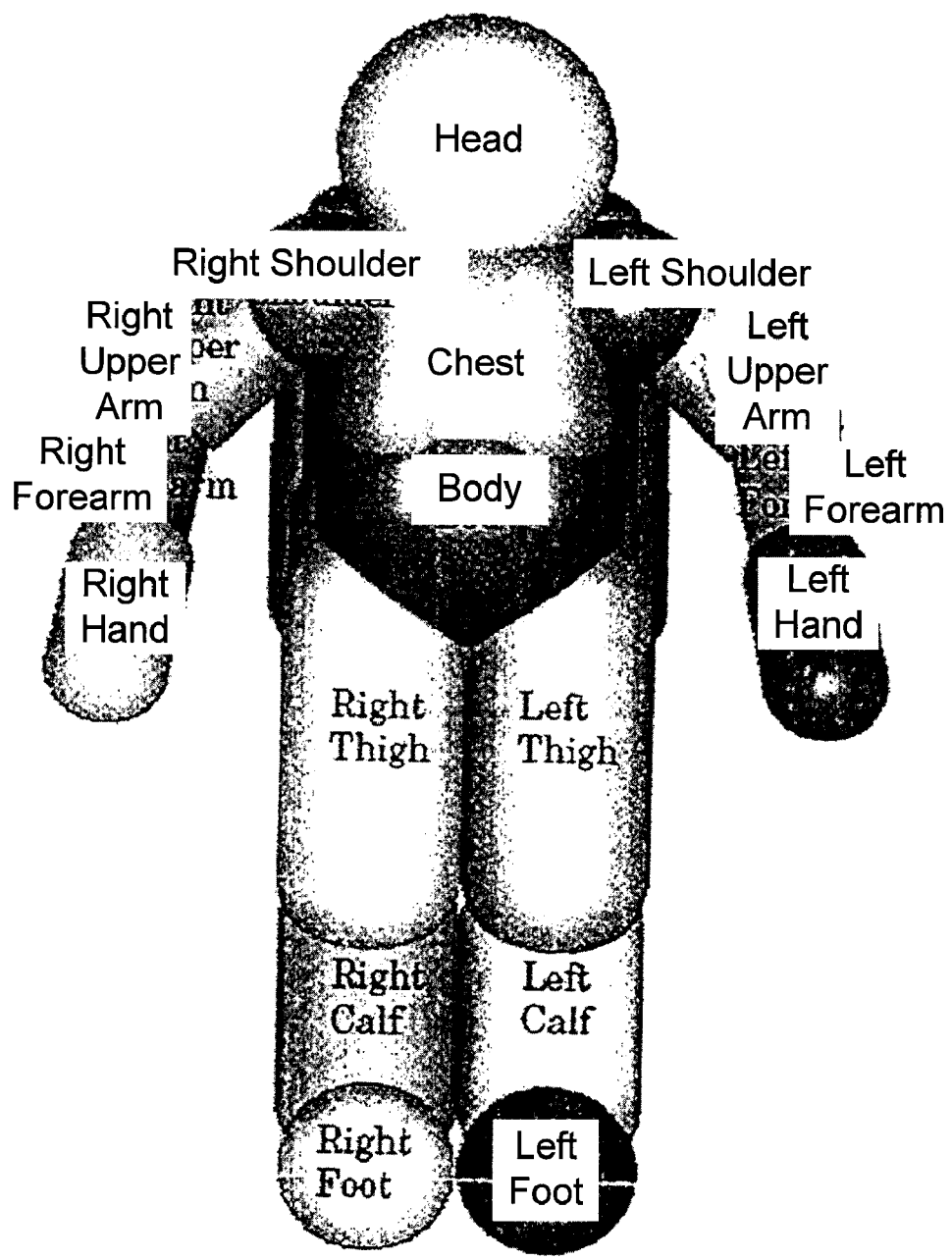
FIG. 1 is a diagram illustrating a humanoid robot having seventeen (17) segments where each segment comprises one or more sphere swept-lines or spheres, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMS, magnetic-optical disks, read-only memories (ROMs), random access memories (RAMs), EPROMS, EEPROMS, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Effectors include manipulators in industrial robots. In humanoid robotics, the effector is often defined as a reference point of the hand such as the finger tip. The effector could also be the head, which is controlled to face a certain point or in certain direction.

Task coordinates refer to coordinates in which the movement of the effector is described. There are many ways to describe effector motions. To describe the positions of the effectors, the x, y and z elements of a position vector are commonly chosen. For spatial orientations, the task is often described in Euler angles or quaternions. In many cases, special descriptions for a task are used.

Task space refers to the space that is described by the task coordinates. For example, if the hand position of a robot is controlled in x, y and z direction, the task space has a dimension of three (3) and is described by these coordinates.

Null space refers to the space where a motion does not influence the task space motion. For example, if a robot has seven (7) degrees of freedom, and the task vector is three (3) dimensional hand position, then the null space has four (4) dimensions. The system is redundant with respect to the task. All motions of the arm that do not interfere with the task motion are referred to as the null space motion herein.

Trajectory is a continuous path describing the motion of a system. The trajectory can describe the path of the individual joints or a path represented in the task coordinates.

Distance Computation

For collision avoidance, it is necessary to compute distances and closest points between segments which are physical links separated by joints. It is more complex to compute actual distances and closest points for all possible segment pairs of humanoid robots within a constrained computation time, especially when the computation is performed on an embedded computer of the robot.

Therefore, in one embodiment of the present invention, a collision model with primitive objects as shown in FIG. 1 is defined. Each segment (Head, Right Shoulder and so on) is composed of one or more spheres or swept sphere lines (SSLs) in order to cover the shape of the robot. The distances and closest points are then calculated based on this model.

Collision Avoidance

Figure 2:
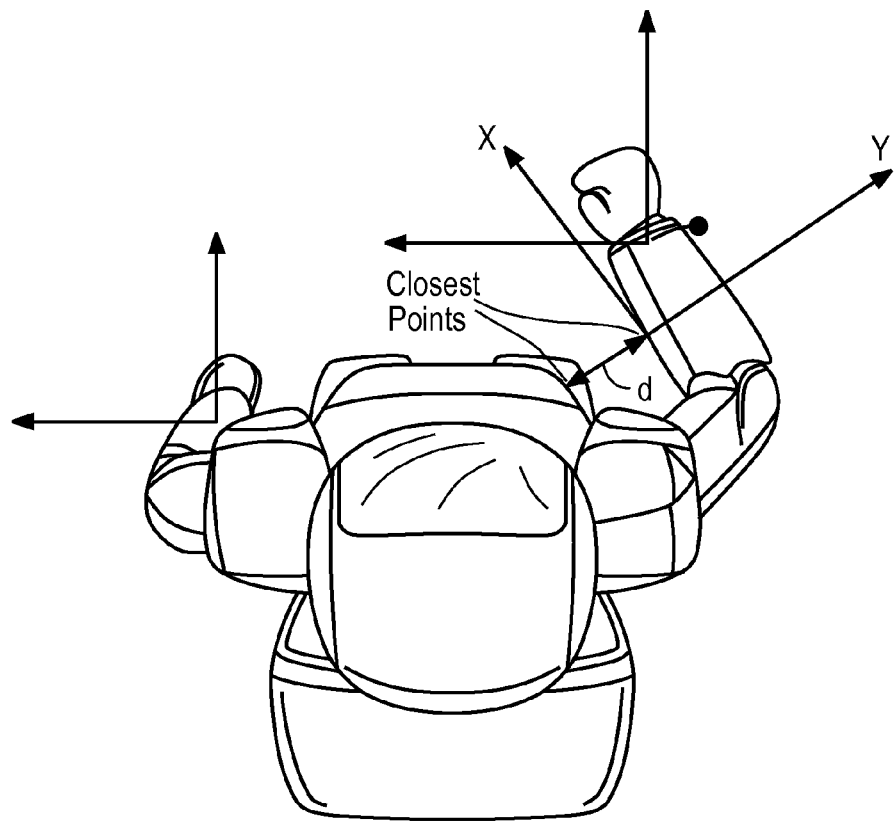
FIG. 2 is a diagram illustrating a collision avoidance coordinate system, according to one embodiment of the present invention.

The role of collision avoidance is to move away segments that are close to each other. One of the most efficient ways to move away the segments apart is by moving the segments in a direction parallel to the vector which connect closest two points of the segments. A collision avoidance coordinate system is defined for task space motions in the collision avoidance control. An example of the collision avoidance coordinate system is defined as illustrated in FIG. 2. The origin is the closest point on the lower arm. y-axis is aligned to a line that connects the closest points so that the direction of avoidance is aligned to this axis. x-axis is aligned to the vector that extends from the elbow to the wrist position. z-axis is an outer product of a unit vector of x direction and a unit vector in y direction. The collision avoidance moves segments only in the y direction on this coordinate system.

In other words, according to one embodiment of the present invention, only one degree of freedom is used for the collision avoidance instead of three degrees of freedom. The other degrees of freedom remain available for null space and for target reaching motions.

Figure 3:
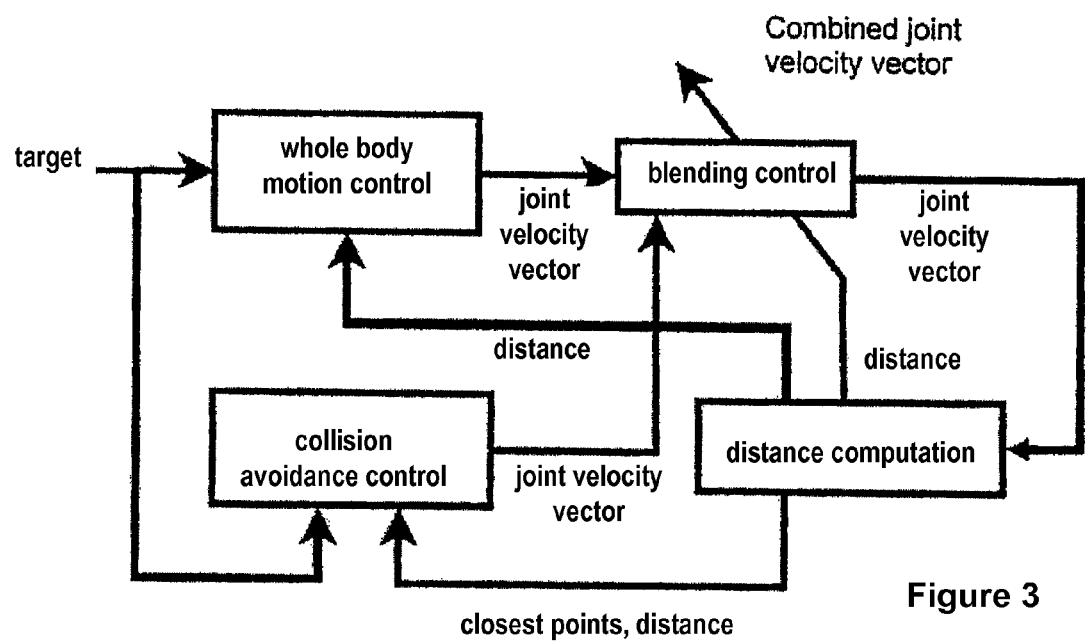
FIG. 3 is a block diagram illustrating control modules of a robot, according to one embodiment of the present invention.
Figure 4:
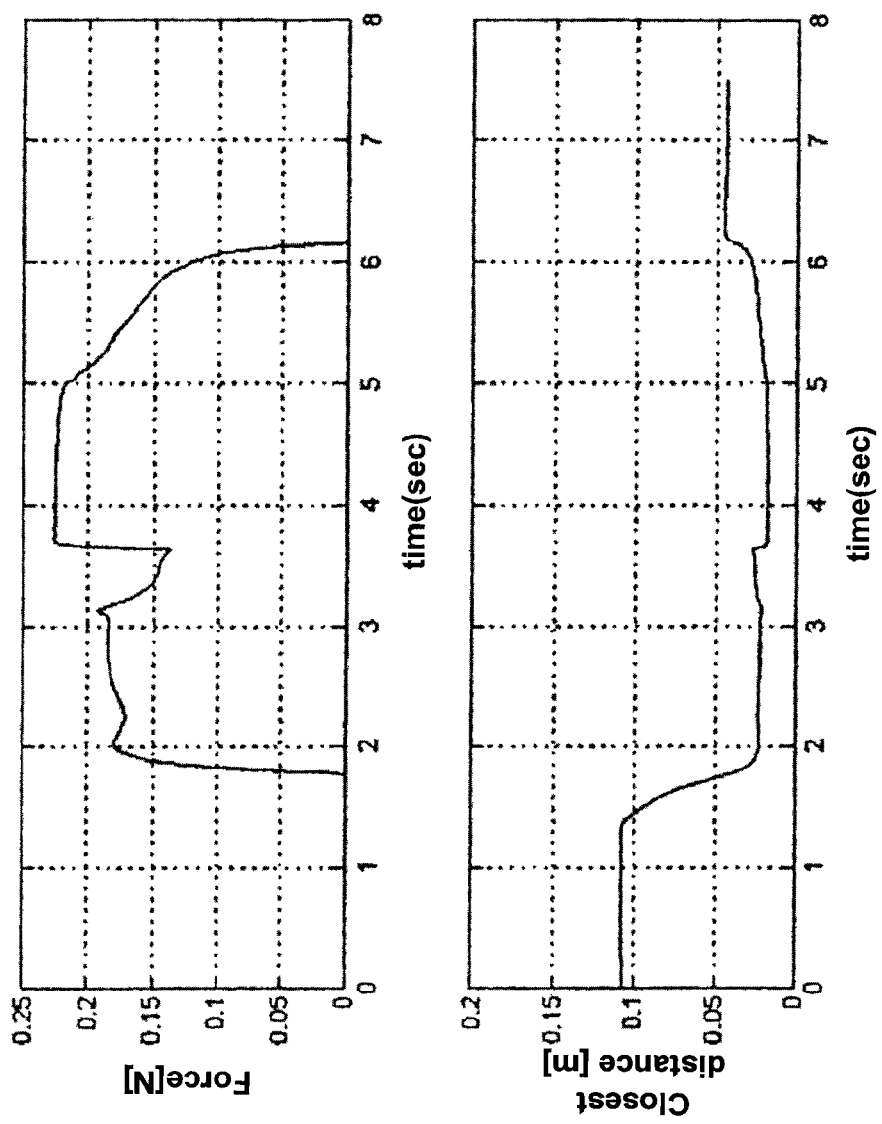
FIG. 4 illustrates virtual force as a function of the closest distance, according to one embodiment of the present invention.

FIG. 3 is a diagram illustrating main computing blocks, according to one embodiment of the present invention. A target (defined externally or by the robot itself) is supplied to a motion control unit such as a whole body motion (WBM) control unit and a collision avoidance (CA) unit. The whole body motion is to be understood as being merely an example for a motion of the robot.

The WBM unit outputs a first joint velocity vector signal to a blending unit that combines this signal with a second joint velocity vector signal from the CA control unit. The blending control unit outputs a combined joint velocity vector based on which the robot's motion is controlled.

The combined joint velocity vector is furthermore provided to a distance computing unit that calculates the two closest points of different segments of the robot connected to each other via at least one joint or a segment of the robot and another object. The distance computing unit outputs closest point data and distance information to the CA control unit. The distance computing unit also outputs distance information to the motion control unit and to the blending unit. The blending unit calculates the blending ratio between the first and the second joint velocity vector on the basis of the distance information provided.

A. Collision Avoidance Control Using Null Space Criteria

Generally, the Cartesian position and orientation x of an effector of a robot can be described as a function of the vector of joint variables q of the manipulator.

$$x = f(q)$$

While this equation can be obtained easily, the inverse problem is crucial. In redundant cases, it is generally not possible to find an inverse mapping $f^{-1}$. Instead of constructing an inverse function $g(x)$ with $$f(g(x))=x$$

analytically, the problem is often reformulated in the velocities utilizing the partial derivation of $f(q)$.

$$\dot{x} = J(q)\dot{q}$$
$$J = \frac{\partial f(q)}{\partial q}$$

Due to the fact that the inverse of the non-square (analytical) Jacobian $J(q)$ does not exist in the redundant case, the pseudo inverse is utilized.

The task space is used for collision avoidance and the null space is used for moving towards the target using a potential function (cost function). In this control method, each joint velocity is computed as:

$$\dot{q}_{ca}=J_{ca}{}^{\#}(q)|_{row.y}\dot{y}_{ca}+N_{ca}\xi_t \quad (1)$$

where $J_{ca}(q)$ is the collision avoidance Jacobian between closest points, $N_{ca}$ is a matrix which maps $\xi$ to the null space, $J_{ca}{}^{\#}(q)|_{row.y}$ is the row vector extracted from the pseudo inverse Jacobian $J_{ca}(q)$ and which is in the y-axis in the collision avoidance coordinate system illustrated in FIG. 2, and $\dot{y}_{ca}$ is an avoidance velocity which is derived from a virtual force $F_{virtual}$.

In this example, the collision avoidance takes over control for only one degree-of-freedom (specifically, in y direction) in order to avoid the closest segment. Zje collision avoidance does not affect other degrees of freedom, which remains available for the task execution (e.g., target reaching motions related to the x and z direction). This means that the collision avoidance uses one degree of freedom for each arm, respectively.

In the following equation (2), D is a pre-set non zero dampening coefficient.

$$\dot{y}_{ca} = \frac{F_{virtual}}{D} \quad (2)$$

$$F_{virtual} = \begin{cases} d_a - d & \text{if } d < da \\ 0 & \text{otherwise} \end{cases} \quad (3)$$

If the distance d between the closest points is shorter than a threshold distance $d_a$ set for activating/deactivating the collision avoidance, the virtual force value and the avoidance velocity is greater than zero. The virtual force and the avoidance velocity increase proportional (e.g., linearly) to the difference between d and $d_a$. Thus the collision avoidance is activated as soon as the closest point distance d is smaller than the preset threshold value $d_a$. (In the example of FIG. 2, the distance d between the closest points of the robot is indicated as the distance between the right arm and the front of the body of the humanoid robot).

$N_{ca}$ matrix maps $\xi$ into null space and I is the identity matrix.

$$N_{ca}=I-J_{ca}(q)^{\#}J_{ca}(q) \quad (4)$$

The potential function $H_t(r)$ leads to the target for the null space. Let $\alpha(t)$ be a step width.

$$\xi_t = -\alpha_t\left(\frac{\partial H_t(r)}{\partial q}\right)^T \quad (5)$$

$$\frac{\partial H_t(r)}{\partial q} = \frac{\partial H_t(r)}{\partial r}\frac{\partial r}{\partial q} \quad (6)$$

$$= \frac{\partial H_t(r)}{\partial r}J(q)$$

$$H_t(r) = \frac{1}{2}(r_{curr} - r_t)^T W_t(r_{curr} - r_t) \quad (7)$$

where $W_t$ is a weighting matrix, and $r_t$ is a target vector

Thus, the collision avoidance controls joints for the collision avoidance in task space and the target reaching in null space.

B. Whole Body Motion Control

On the other hand, the whole body motion control is used in order to control the robot that has redundant degrees of freedom also with null space optimization criteria as, $$\dot{q}_{wbm}=J_{wbm}{}^{\#}(q)\dot{x}_{task}+N_{wbm}\xi_{wbm} \quad (8)$$

$$N_{wbm}=I-J_{wbm}{}^{\#}(q)J_{wbm}(q) \quad (9)$$

where $\dot{q}_{wbm}$ is a joint velocity vector, $J_{wbm}{}^{\#}(q)$ is pseudo inverse Jacobian of overall joints, and $\dot{x}_{task}$ is task velocity vector.

The matrix $N_{wbm}$ maps an arbitrary joint velocity vector $\xi_{wbm}$ into the null space. Two cost functions can be used for the null space. Let $\alpha_{jc}$ and $\alpha_{ca}$ the step width, then:

$$\xi_{wbm} = -\alpha_{jc}\left(\frac{\partial H_{jc}(q)}{\partial q}\right)^T - \alpha_{ca}\left(\frac{\partial H_{ca}(q)}{\partial q}\right)^T \quad (10)$$

The first cost function penalizes deviations from an arbitrary joint center vector $\tilde{q}$. This cost function seeks to control any joint close to its neutral position. In this regard, a joint limit avoidance cost function is used.

$$H_{jc}(q) = \frac{1}{2}(q - \tilde{q})^T W_{jc}(q - \tilde{q}), \quad (11)$$

where $W_{jc}$ is a weighting matrix. In the simplest case, we choose joint center $\tilde{q}$ accordingly. This cost function allows the joint limits to be avoided easily.

The second one cost function implements the collision avoidance.

$$\frac{\partial H_{ca}(d)}{\partial q} = \frac{\partial H_{ca}(d)}{\partial d}\frac{\partial d}{\partial q} \quad (12)$$

$$= \frac{\partial H_{ca}(d)}{\partial d}J_{ca}^{\#}(q)$$

$$H_{ca}(d) = \frac{1}{2}(d_{safe} - d)^T W_{ca}(d_{safe} - d), \quad (13)$$

where $W_{ca}$ is a weighting matrix for the collision avoidance. Thus, the whole body motion controls joints for the target reaching in null space, the collision avoidance and joint limit avoidance in null space.

C. Integration of Whole Body Motion Control and Collision Avoidance

The output of the whole body motion control and the output of the collision avoidance motion control are blended into joint velocities according to the closest distance. The final joint velocity vector $\dot{q}$ is $$\dot{q} = \{1 - f(d)\} q_{control} + f(d) q_{ca} \qquad (14)$$

where $\dot{q}_{control}$ is the joint velocity vector computed by a robot controller such as whole body motion control, $\dot{q}_{ca}$ is the joint velocity vector computed by the collision avoidance controller, and f(d) is a gain factor which can assume values between 0 and 1 to represent the magnitude of danger of collisions, for example, as a function of the shortest distance between segments. If f(d) is equal to "1", the collision avoidance entirely takes over control. If f(d) is equal to "0", the robot controller entirely takes over control, f(d) is defined as following:

$$f(d) = \begin{cases} \dfrac{d - d_a}{d_b - d_a} & \text{if } d < d_a \\ 0 & \text{otherwise} \end{cases}$$

$d_b$ is a preset constant threshold distance where the whole body motion control is switched off, wherein $d_a > d_b$.

If d is larger than $d_a$, the collision avoidance control is deactivated and the robot tracks the trajectory which is generated by the whole body motion control. However, trajectories computed by the whole body motion take into account collision avoidance in null space. If d is smaller than $d_a$, the collision avoidance is activated. The ratio between them depends on the shortest distance between the closest segments.

Both the collision avoidance control and the robot control use null space optimization criteria. These criteria are composed of the task space and the null space. The task space always has higher priority than null space. On one hand, the robot control maps a target reaching motion in the task space and a collision avoidance motion in the null space. On the other hand, the collision avoidance control maps a collision avoidance motion in task space and a target reaching motion in the null space.

|  | motion in task space | motion in null space |
| --- | --- | --- |
| robot control ($\dot{q}_{control}$) | target reaching | collision avoidance |
| collision avoidance control ($\dot{q}_{ca}$) | collision avoidance | target reaching |

As illustrated by the above equation (14), the robot control contribution and the collision avoidance control contribution are blended depending on f(d). When f(d) increases, then the collision avoidance motion becomes more important with respect to robot motions. However, target reaching motions are compiled in the null space in the collision avoidance control and if f(d) is not "1", the robot control contributes to move towards the target. This enables a smooth task priority switching.

Examples of Experiments

Examples of experiments are described below. The leg movements were disabled in the experiment because otherwise the robot may simply walk away to avoid collisions without moving arms.

1) Target is Inside of the Body, with Leg Movements

The given target is inside of the body of the robot. When the shortest distance is shorter than $d_a$, the robot steps back due to the virtual force applied between the lower arm and the body to avoid collision. On the other hand, the robot moves to the target by the motion control (8). However, not all arm joints can be used because the collision avoidance also use them and the target is inside of the body. Thus, the whole body motion compensates the motion by using the available leg position. In other words, the robot is pushed back by virtual force. The following experiments do not use leg movements for the collision avoidance in order to ensure that arm motions are used for avoidance.

2) Target is Inside of the Body, without Leg Movements:

The target of the right arm is inside the body of the robot. When the collision avoidance is deactivated, the lower arm collides with the body.

As a result of the collision avoidance, the arm motion stops before colliding with the body. The robot moves its body towards the point closest to the target and attempts to reach the target even though the target is inside the body. It is compensation by the whole body motion control.

3) Target of an Arm is Inside the Other Arm, Respectively:

The target for the right arm is inside the left arm. The target for the left arm is inside the right arm.

4) Body Violates a Trajectory:

The body is placed on the trajectory between the current position and the target position. This is a typical case where the robot cannot reach the target without the collision avoidance. The collision avoidance pushes the arm limbs outward by the virtual force before the arm limbs collide with the body or the leg. The virtual force is generated when the shortest distance is shorter than the avoidance threshold distance $d_a$.

5) Collision Avoidance While Walking:

The target is behind the robot when the robot starts walking. The leg position moves but it does not contribute to the collision avoidance because the collision avoidance does not use leg movements.

The robot looks upwards in an attempt to reach the target. But immediately after the robot starts walking, the robot does not tilt because the posture while walking is almost fixed. After a while, the robot stops and looks upwards again.

6) Tracking Targets Based on Vision:

Finally, we tested the collision avoidance for tracking targets using vision. The robot tracks two targets that are crossing. The targets are crossed, which means that the right arm and the left arm are crossed.

7) Applications:

The collision models used in distance computations can be defined anywhere in space and the collision avoidance simply avoids it.

It is also possible to define "virtual objects" in space. This means that an area can be defined where a robot segment is not allowed to enter. Such area may be used as an "occlusion avoidance." One of the major problems when robots grab something is occlusions that are caused by their hands hiding target objects. In one embodiment of the present invention, a virtual obstacle can be configured and placed between the robot head and the target so that the hands of the robot do not interfere with the robot's view of the target. The virtual object may be inactivated right before the robot reaches to the object.

Embodiments of the present invention relate to a technique for a safety mechanism that protects articulated robots and the environment in which the robot is operating. In particular, embodiments may be employed in robots that interact with dynamic environment that is difficult to predict in real-time. The following are illustrative examples where embodiments of the present invention may be used:

(1) Tracking moving targets that are captured by cameras: Robots need to track moving targets movement of which cannot be predicted while avoiding self collisions at the same time.

(2) Bimanual manipulations: Robots move both arms at the same time according to tasks. Each arm has a target respectively and they sometimes cross each other.

(3) Avoid moving obstacles: Robots need to avoid moving objects such as humans.

The collision avoidance uses only one degree of freedom. On the other hand, target reaching motions are achieved by (1) null space in the collision avoidance control, and (2) task space in the robot control.

By limiting the collision avoidance motion to a single degree-of-freedom, the null space motion of the collision avoidance control allows for a target reaching motion is increased although the collision avoidance control allocates higher priority to the collision avoidance task compared to the target reaching task. Thus, the movement towards a target is more efficient compared to conventional methods While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for controlling a robot, comprising:
defining a target for a motion of the robot;
supplying the target to a whole body motion control unit and a collision avoidance control unit;
combining a joint velocity vector calculated by the whole body motion control unit with a joint velocity vector calculated by the collision avoidance control unit in a blending control unit;
outputting a combined joint velocity vector by the blending control unit;
calculating a distance between different segments of the robot connected to each other via at least one joint or a segment of the robot and another object by a distance computation unit based on the combined joint velocity vector;
submitting the computed distance information to the collision avoidance control unit, the whole body motion control unit and the blending control unit;
calculating a final joint velocity vector $\dot{q}$ by $\dot{q}=\{1-f(d)\}\dot{q}_{control}+f(d)\dot{q}_{ca}$ wherein $\dot{q}_{control}$ is the joint velocity vector calculated by the whole body motion control unit, $\dot{q}_{ca}$ is the joint velocity vector calculated by the collision avoidance control unit, f(d) representing a function of a shortest distance between segments, wherein the result of function f(d) decides whether the collision avoidance control unit takes over controlling of the robot or the whole body motion control unit takes over control of the robot; and
calculating a motion control signal adapted to command the robot to reach the target on the basis of the final joint velocity vector and controlling the robot based on the calculated motion control signal.

2. The method of claim 1, wherein the first gain factor and the second gain factor change gradually to perform a soft task switching between reaching of the target and collision avoidance.

3. The method of claim 2, wherein the collision avoidance unit is activated if d is smaller than $d_a$.

4. The method of claim 1, wherein f(d) is defined as $$f(d) = \begin{cases} \frac{d-d_a}{d_b-d_a} & \text{if } d < d_a \\ 0 & \text{otherwise} \end{cases}$$

and wherein db is a preset constant threshold distance where the whole body motion control is switched off, wherein $d_a > d_b$.

5. The method of claim 4, wherein the collision avoidance control unit is deactivated and the robot tracks a trajectory generated by the whole body motion control unit if d is bigger than $d_a$.

6. The method of claim 4, wherein trajectories computed by the whole body motion unit take into account collision avoidance in nullspace.

7. The method of claim 1, wherein the whole body motion control unit maps a target reaching motion in task space and collision avoidance motion in nullspace.

8. The method of claim 1, wherein the collision avoidance control unit maps a collision avoidance motion in task space and a target reaching motion in nullspace.

9. A non-transitory computer readable storage medium structured to store instructions executable by a processor in a computing device, the instructions, when executed cause the processor to:
define a target for a motion of a robot;
supply the target to a whole body motion control unit and a collision avoidance control unit;
combine a joint velocity vector calculated by the whole body motion control unit with a joint velocity vector calculated by the collision avoidance control unit in a blending control unit;
output a combined joint velocity vector by the blending control unit;
calculate a distance between different segments of the robot connected to each other via at least one joint or a segment of the robot and another object by a distance computation unit based on the combined joint velocity vector;
submit the computed distance information to the collision avoidance control unit, the whole body motion control unit and the blending control unit;
calculate a final joint velocity vector $\dot{q}$ by $\dot{q}=\{1-f(d)\}\dot{q}_{control}+f(d)\dot{q}_{ca}$ wherein $\dot{q}_{control}$ is the joint velocity vector calculated by the whole body motion control unit, $\dot{q}_{ca}$ is the joint velocity vector calculated by the collision avoidance control unit, f(d) representing a function of a shortest distance between segments, wherein the result of function f(d) decides whether the collision avoidance control unit takes over controlling of the robot or the whole body motion control unit takes over control of the robot; and
calculate a motion control signal adapted to command the robot to reach the target on the basis of the final joint velocity vector and controlling the robot based on the calculated motion control signal.

10. The computer readable storage medium of claim 9, wherein f(d) is defined as $$f(d) = \begin{cases} \dfrac{d - d_a}{d_b - d_a} & \text{if } d < d_a \\ 0 & \text{otherwise} \end{cases}$$

and wherein $d_b$ is a preset constant threshold distance where the whole body motion control is switched off, wherein $d_a > d_b$.

11. The computer readable storage medium of claim 10, wherein the collision avoidance control unit is deactivated and the robot tracks a trajectory generated by the whole body motion control unit if d is bigger than $d_a$.

12. The method of claim 10, wherein the collision avoidance unit is activated if d is smaller than $d_a$.

13. The method of claim 9, wherein trajectories computed by the whole body motion unit take into account collision avoidance in nullspace.

14. The method of claim 9, wherein the whole body motion control unit maps a target reaching motion in task space and collision avoidance motion in nullspace.

15. The method of claim 9, wherein the collision avoidance control unit maps a collision avoidance motion in task space and a target reaching motion in nullspace.

16. A motion control unit in a robot, comprising:
   a whole body motion control unit;
   a collision avoidance unit;
   a blending control unit adapted to:
      combine a joint velocity vector calculated by the whole body control unit with a joint velocity vector calculated by the collision avoidance control unit; and
      output a combined joint velocity vector;
      submit the computed distance information to the collision avoidance control unit, the whole body motion control unit and the blending control unit; and
   a distance computing unit adapted to calculate a distance between different segments of the robot connected to each other via at least one joint or a segment of the robot and another object based on the combined joint velocity vector and submit the computed distance information to the collision avoidance control unit, the whole body motion control unit and the blending unit;
   wherein the whole body motion control unit is adapted to:
      define a target for a motion of the robot;
      supply the target to a whole body motion control unit and a collision avoidance unit control;
      combine a joint velocity vector calculated by the whole body motion control unit with a joint velocity vector calculated by the collision avoidance control unit in a blending unit;
      output a combined joint velocity vector by the blending unit;
      calculate a distance between different segments of the robot connected to each other via at least one joint, or a segment of the robot and another object, by a distance computing unit based on the combined joint velocity vector;
      submit the computed distance information to the collision avoidance control unit, the whole body motion control unit and the blending unit;
      calculate a final joint velocity vector $\dot{q}$ by $\dot{q} = \{1-f(d)\}\dot{q}_{control} + f(d)\dot{q}_{ca}$ wherein $\dot{q}_{control}$ is the joint velocity vector calculated by the whole body motion control unit, $\dot{q}_{ca}$ is the joint velocity vector calculated by the collision avoidance control unit, f(d) represents a function of a shortest distance between segments, wherein the result of function f(d) decides whether the collision avoidance control unit takes over controlling of the robot, or whether the whole body motion control unit takes over control of the robot;
      calculate a motion control signal adapted to command the robot to reach the target on the basis of the final joint velocity vector and controlling the robot based on the calculated motion control signal.

17. The motion control unit of claim 16, wherein f(d) is defined as $$f(d) = \begin{cases} \dfrac{d - d_a}{d_b - d_a} & \text{if } d < d_a \\ 0 & \text{otherwise} \end{cases}$$

and wherein $d_b$ is a preset constant threshold distance where the whole body motion control is switched off, wherein $d_a > d_b$.

18. The motion control unit of claim 17, wherein the collision avoidance control unit is deactivated and the robot tracks a trajectory generated by the whole body motion control unit if d is bigger than $d_a$.

19. The motion control unit of claim 16, wherein trajectories computed by the whole body motion unit take into account collision avoidance in nullspace.

20. A robot having a motion control unit for avoiding collision, comprising:
   a whole body motion control unit:
   a collision avoidance unit control;
   a blending unit combining a joint velocity vector calculated by the whole body motion control unit with a joint velocity vector calculated by the collision avoidance control unit, and outputting a combined joint velocity vector;
   a distance computing module adapted to calculate a distance between two different segments of the robot connected to each other via at least one joint or a segment of the robot and another object based on the combined joint velocity vector, and submit the computed distance information to the collision avoidance control unit, the whole body motion control unit and the blending unit; and
   wherein the motion control unit is adapted to:
      define a target for a motion of the robot;
      supply the target to a whole body motion control unit and a collision avoidance unit control;
      combine a joint velocity vector calculated by the whole body motion control unit with a joint velocity vector calculated by the collision avoidance control unit in a blending unit;
      output a combined joint velocity vector by the blending unit;
      calculate a distance between different segments of the robot connected to each other via at least one joint, or a segment of the robot and another object, by a distance computing unit based on the combined joint velocity vector;
      submit the computed distance information to the collision avoidance control unit, the whole body motion control unit and the blending unit;
      calculate a final joint velocity vector $\dot{q}$ by $\dot{q} = \{1-f(d)\}\dot{q}_{control} + f(d)\dot{q}_{ca}$ wherein $\dot{q}_{control}$ is the joint velocity vector calculated by the whole body motion control unit, $\dot{q}_{ca}$ is the joint velocity vector calculated by the collision avoidance control unit, f(d) represents a function of a shortest distance between segments, wherein the result of function f(d) decides whether the collision avoidance control unit takes over controlling of the robot, or whether the whole body motion control unit takes over control of the robot;

calculate a motion control signal adapted to command the robot to reach the target on the basis of the final joint velocity vector and controlling the robot based on the calculated motion control signal.

* * * * *

UNITED STATES PATENT AND TRADEMARK OFFICE
CERTIFICATE OF CORRECTION

PATENT NO. : 8,311,731 B2
APPLICATION NO. : 12/052483
DATED : November 13, 2012
INVENTOR(S) : Hisashi Sugiura et al.

It is certified that error appears in the above-identified patent and that said Letters Patent is hereby corrected as shown below:

Title Page 2, Item (56) U.S. PATENT DOCUMENTS, line 6, please replace -- 626,569 A1  12/2009  Lanier -- with "7,626,569 A1  12/2009  Lanier".

Signed and Sealed this
Ninth Day of July, 2013

Teresa Stanek Rea
*Acting Director of the United States Patent and Trademark Office*